Patented Aug. 27, 1940

2,212,917

UNITED STATES PATENT OFFICE 2,212,917

INORGANIC CHROME PIGMENT PRODUCTION

Samuel C. Horning, Newark, N. J., assignor to E. I. du Pont de Nemours & Company, Wilmington, Del., a corporation of Delaware No Drawing. Application July 23, 1937, Serial No. 155,230

22 Claims. (Cl. 134—58)

This invention relates to the production of chromate pigments and particularly to lead chromate and pigment compositions containing the same. In a more specific sense, the invention involves the production of lead chromate which is substantially uniform and relatively minute in particle size, and adapted for use in pigment compositions, as well as in printing inks, paints and vehicles commonly employed in conjunction therewith.

Lead chromate pigments and particularly chrome yellows embracing the lighter or greener shades, are subject to peculiar and decided shade changes during the isolation and drying stages of their production. To overcome this defect, as well as render the product more stable to light, various expedients have been resorted to, such as the addition of aluminum sulfate or similar agent under such conditions that the aluminum is wholly or partially precipitated as a hydrous oxide in the pigment slurry. The presence of these addition agents in the color, however, is very disadvantageous, particularly when the treated pigment is ground for use in lithographic varnish or printing inks. In such instances, a deleterious gelling or bodying of the varnish or ink to a relatively hard, non-fluid mass results, rendering the product unfit and useless for any intended purpose. This gelling or bodying is known and denominated in the art as "livering." In addition, pigments in which these prior addition agents are contained possess the further objectionable property, when ground in lithographic varnish, of marked lack of resistance to strongly acid media, such as chromic acid or zinc nitrate solutions present in lithographic printing press fountains. Due to constant contact of the ink with the aqueous media, the pigment tends to become more readily wetted by the solution than the oil, and a pronounced, objectionable thickening of the mixture and accompanying transfer or "bleeding" of the pigment from the oil into the separate water phase occurs. This phenomenon is known and denominated in the art as "lithographic breakdown."

It is among the objects of my invention to overcome the foregoing as well as other disadvantages in prior chrome pigment production, and to provide in particular a relatively inert lead chromate of controlled, uniform, and extremely minute particle size; of fine texture and opacity; great tinting strength and brilliance; highly resistant towards fading, even after prolonged exposure to light; free from color change during processing; highly resistant to strongly acid media or vehicles it may contact or be associated with during use; and free from any tendency towards "livering" or "lithographic breakdown."

These as well as other objects and advantages inherently result from my invention, which broadly comprises employing in lieu of aluminum salts or similar agents previously used in the treatment of lead chromate pigments, any of the soluble salts of the metals of the first sub-group of Group IV or the metals of Group V of the Periodic Table of Elements which are easily hydrolyzed in acid or alkaline solution and form insoluble, colorless, or white hydrous oxides.

In a more specific and preferred embodiment, my invention comprises adding to a lead chromate suspension an aqueous solution containing titanyl sulfate, titanium sulfate, or zirconium sulfate, or mixture, under such conditions that such agents, or either of them, become partially or completely precipitated upon the lead chromate in the form of a hydrous oxide.

In order that the invention may be more clearly understood, the following examples are given, each of which is merely illustrative in character, and none of which is in limitation of the underlying concepts of my invention:

Example I

To a solution of 331 gms. of lead nitrate in 10 liters of water at 27° C. is added 200 cc. of a solution containing 41 gms. of soda ash. The pigment is precipitated by adding with agitation over a period of 30 minutes 5 liters of a solution containing 92 grams of $Na_2Cr_2O_7.2H_2O$ and 37.8 grams of anhydrous sodium sulphate. A solution containing 14 grams of sodium bicarbonate in 1 liter is immediately added resulting in a pH in the slurry of 6.2. The pigment is washed by decantation and a solution of a sulphate of titanium equivalent to 10 grams of $TiO_2$ dissolved in 200 cc. of dilute sulphuric acid is then added. The slurry is neutralized to a pH of 6.2 with approximately 60 grams of sodium bicarbonate. The pigment slurry is then diluted to 18 liters and after filtering and drying a brilliant non-livering light yellow results, having an average particle size of 0.51 microns.

Example II

To a solution of basic lead acetate containing the equivalent of 111.5 gms. of lead oxide (PbO) and 20 gms. of acetic acid is added 6.5 gms. 100% hydrochloric acid (20.65 gms. of 20° Bé. HCl) and after stirring for 15 minutes the volume is adjusted to 2 liters at 21° C. To this mixture is added over a period of 30 minutes 500 cc. of a solution containing 48.8 gms. of sodium bichromate, 4.07 gms. of 100% hydrochloric acid and 5 gms. of titanyl sulfate (calculated as TiO₂). The volume is increased to 8 liters and the precipitate washed three times by decantation, filtered and dried, 160 gms. of the product being recovered as a result. The lead chromate thus resulting had an average particle size of 0.92 microns.

Example III

A solution of basic lead acetate containing the equivalent of 111.5 gms. of lead oxide (PbO) and 20 gms. of acetic acid is treated with 6.5 gms. of 100% hydrochloric acid. The volume is adjusted to 2 liters at 21° C. and a solution of 50.4 gms. of sodium bichromate, 32.5 gms. of aluminum sulfate (Al₂(SO₄)₃.18H₂O) and 4.2 gms. of 100% hydrochloric acid in 500 cc. is added over a period of 30 minutes. The volume is made to 8 liters and the precipitate washed twice by decantation. A solution of 5 gms. of TiO₂ as Ti(NO₃)₄ is then added to the washed slurry followed by 16 gms. of sodium bicarbonate to give a pH of 6.1. The volume is made to 8 liters and the precipitate washed once by decantation, filtered and dried, from which 162 gms. of Chrome Yellow pigment is obtained, having an average particle size of 1.09 microns.

Example IV

To a solution of basic lead acetate containing the equivalent of 111.5 gms. of lead oxide (PbO) and 20 gms. of acetic acid is added 6.5 gms. of 100% hydrochloric acid (20.65 gms. of 20° Bé. HCl) and after stirring for 15 minutes the volume is adjusted to 2 liters at 21° C. To this mixture is added in 30 minutes a solution of 50.4 gms. of sodium dichromate and 32.5 gms. of aluminum sulfate (Al₂(SO₄)₃.18H₂O) and 4.2 gms. of 100% hydrochloric acid in 500 cc. The volume is then increased to 8 liters and the precipitate washed twice by decantation. There is then added a solution of zirconium oxychloride (ZrOCl₂ followed by 9.0 gms. of sodium bicarbonate to precipitate the ZrO₂. A yield of 159 gms. of product is recovered, having an average particle size of 1.14 microns.

Example V

To 1 gm. mole of lead chloride in 10 liters of water at 37° C. is added in 30 minutes 2 liters of a solution containing one gram mole of anhydrous sodium chromate. 200 cc. of a solution containing 20 gms. of TiOSO₄ is then added followed by 60 gms. of sodium bicarbonate to a pH of 6.2. The pigment is washed by decantation and after filtering and drying a strong, brilliant medium yellow is obtained, having an average particle size of 0.45 microns.

Example VI

To one liter of a solution of basic lead acetate containing the equivalent of 111.5 gms. of lead oxide (PbO) and 20 gms. of acetic acid is added 42.5 gms. of dry sodium bicarbonate and the mixture is stirred for 1 hour and then flooded to a volume of 8 liters. The precipitate is washed twice by decantation and the final volume adjusted to 1.5 liters. 22.5 gms. of 100% nitric acid is then added followed by a solution of 41 gms. of sodium bichromate and 17.5 gms. of 100% sulfuric acid in 500 cc. There is then added 5 gms. of zirconium sulfate (Zr(SO₄)₂) in 100 cc. of water. The mixture is then adjusted to a pH of 6.2 with a solution of 2.5 gms. of soda ash followed by a solution of 0.5 gms. of citric acid. The pigment is washed by decantation, filtered and dried, 157 gms. of a Primrose Chrome Yellow pigment being obtained with an average particle size of 0.60 microns.

Example VII

To 165.5 gms. of lead nitrate in 7.4 liters of water at 18° C. is added over a period of 30 minutes 4.8 liters of a solution containing 50.2 gms. of potassium bichromate, 9.6 gms. of 100% sulfuric acid and 11.2 gms. of sodium molybdate (100% Na₂MoO₄). A solution containing 5 gms. of TiO₂ as TiOSO₄ is added immediately, followed by soda ash (44.3 gms.) to give a pH of 5.9. The pigment is then filtered, washed and dried, 164 gms. of an orange pigment being recovered as the product and determined as having an average particle size of 0.81 microns.

Example VIII

A washed slurry of a Medium Yellow lead chromate pigment made according to Example V and equivalent to 70 parts (dry basis) is mixed with a washed slurry of Iron Blue, equivalent to 30 parts (dry basis) and the whole thoroughly mixed by agitation. It is then filtered, dried and ground in the usual manner. The resulting pigment is a medium shade of chrome green with a very desirable olive cast.

Example IX 75 gms. of the pigment obtained in Example I is ground on a three roller mill with 25 gms. of lithographic varnish (such as Carter's #1 Regular). The yellow ink obtained is stable to storage at 70° C. for three to five days with little evidence of any tendency to body up or "liver." When vigorously stirred with a chromic acid fountain solution (1% CrO₃) for 15 minutes no appreciable change in the consistency of the ink or in its color resulted.

The particle size average determinations set out in the foregoing examples were determined as follows:

Samples of the dry pigment were dispersed and photomicrographs were made essentially in accordance with the procedure described by Henry Green in the Journal of the Franklin Institute, November, 1921. The magnifications selected were sufficient to give satisfactory resolution of the ultimate pigment particles in each case. The negatives thus obtained were enlarged by ordinary photographic means to sizes which permitted a rapid measurement of the particles with a millimeter scale. The average particle size was calculated from the count using the following formula, also mentioned by the above reference:

$$\text{Average particle size} = \frac{\text{Summation of number of particles in size range} \times \text{nominal size in millimeters}}{\text{Total number of particles} \times \text{magnification}}$$

It will thus be seen that in over 70% of the strikes in the foregoing examples (Examples 1, 2, 5, 6–8) the average particle size of the lead chromate obtained ranged from 0.45 to 0.92 microns, whereas in the remaining examples, i. e., 3 and 4, the average particle size of the pigment was but 1.09 and 1.14, respectively. Thus, the average particle size of the chrome pigment obtainable in accordance with my invention will not be substantially in excess of 1 micron in the longer dimension of the crystal, while substantially 95% of the particles will be well below 2.0 microns in length and substantially no particles will be greater than 2 microns in length. At all events, the chrome pigments obtainable herein will be of relatively minute particle size average and in no event will the particle size average of such pigments exceed substantially 3.5 microns in length.

The production of chromate pigments of controlled and relatively fine, minute particle size average is important and essential, not only because fine texture and uniformity are thus assured, but these characteristics render the pigment admirably suited for wide and general usage in commercial applications and pigment compositions. Inherently the product will be manifestly superior because of assured increase in hiding power, tinctorial strength, opacity, and dispersing properties, together with freedom from fading or objectionable shade changes, particularly when prints containing the same are viewed from different angles.

Additionally, not only will my novel product be adapted for wide commercial usage, but the same will be admirably and particularly suited for use in lithographic varnish and printing ink applications, as well, wherein it will manifest complete and remarkably outstanding anti-livering and lithographic breakdown resistance characteristics. Thus, whereas inks produced from prior lead chromate pigments, particularly those employing aluminum sulfate during their processing, "liver" on storage at an elevated temperature (70° C.) in from 24-48 hours (equivalent to approximately 2-4 months of ordinary storage) similar inks, but containing my novel lead chromates, exhibit substantially no livering tendencies, even when maintained at a temperature of 70° C. from 7296 hours (equivalent to approximately 6-8 months of shelf storage). Likewise, when an ink of my improved product, ground in lithographic varnish, is stirred in contact with a lithographic fountain solution, no appreciable bodying or gelling obtains, nor does any appreciable transfer of color to the aqueous phase ensue, and this is true even when the fountain solution is 1% chromic acid and the stirring is continued for 15 minutes. On the other hand, when inks containing prior chrome yellows are subjected to the same test, the composition becomes exceedingly "heavy" and "short" within three minutes of stirring, exhibiting considerable and pronounced color transfer to the aqueous phase.

A probable explanation for the surprisingly new and unexpected results which my invention thus affords is that the soluble salt undergoes partial or complete hydrolysis to an extremely finely divided hydrous oxide which acts to coat the pigment particles, thereby rendering the pigment more readily wetted by oil than by water and less reactive, chemically and physically, with vehicles as distinguished from pigments treated with the hydrous oxides of aluminum and similar metals. This property of rendering the pigment more readily wetted by oil than by water retains the pigment in the oil phase in contact with water, thus inhibiting lithographic breakdown. Due to its less reactive character, beneficial and desired resistance to livering also results.

While it will be seen that generally and preferably I add my novel agents to a freshly prepared suspension of lead chromate or partially washed yellow, and then partially or completely precipitate the same in the form of a hydrous oxide by alkali addition (should the alkalinity of the mixture be insufficient to effect precipitation) many other known methods of use and agent addition may be resorted to with equally beneficial effects and without departure from the underlying concepts of my invention. For example, in chrome yellow production from organic salts of lead such as basic lead acetate, my novel agents may be added during or concurrent with precipitation. Thus, a co-precipitation process is afforded. The alkalinity of the basic lead acetate in the latter instance is sufficient to hydrolyze or precipitate the desired hydrous oxide or oxides. Preferably, however, I resort to what I term an "after treatment" process, i. e., the addition of the soluble metallic salt to a slurry of the pigment, hydrolysis being effected by addition of alkaline agent such as soda ash or sodium bicarbonate. In some instances, however, (and provided it should be desired) the titanium or other metallic salt may be hydrolyzed in the cold with alkali in a separate container, followed by addition of the white hydrous oxide to the completely precipitated lead chromate.

While specific temperatures have been utilized in the preceding examples, it will be understood that suitable variance therefrom may be had without departing from the scope of the invention. In instances where a co-precipitation process is resorted to, however, the suspension of lead chromate, prior to or concurrent with the addition of any of my novel agents, is maintained at a temperature below substantially 60° C., and preferably at temperatures ranging from substantially 15° C. to 40° C. This for the reason that temperatures of the order of 60° C. or higher deleteriously affect the particle size of the resultant pigment, rendering the product not only undesirably and unusually large in particle size, but of unsatisfactory character. Thus, its particle size will be found to be not less than substantially 4 or 5 microns in the longer dimension and frequently exceed 10 and even 15 microns in length. Such non-uniformity and excessively large particle size renders the resultant product poor and weak, of dull mass tone and appearance, and of unsatisfactory low tinctorial strength. In such a state, it will be useless for most commercial applications, and will be particularly unadapted for use in printing ink and lithographic varnish compositions.

In instances where my so-called "after treatment" process is resorted to, i. e., the addition of my novel agents to an already precipitated lead chromate, it will be found that any desired temperature may be utilized during or after addition, and that temperatures as high as substantially 100° C. may be employed. Preferably, however, as in the instance of my co-precipitation process, I employ temperatures ranging from substantially 15° C. to 40° C., since optimum beneficial results are procured in the invention when such temperatures are employed. Accordingly, I recommend the employment of the latter range when adapting the invention to practice according to this modification.

While specific lead salts have been employed in the foregoing examples, it is to be understood I contemplate employing all organic or inorganic lead salts (nitrates, acetates, etc.) which are suitable for reaction with a solution of a chromate to precipitate a normal or basic lead chromate. Likewise, while titanyl sulfate, titanium sulfate, or zirconium sulfate (calculated as $TiO_2$ or $ZrO_2$) or mixtures of the same have been employed in said examples in various amounts, these agents and amounts are set forth because preferred in each instance. These agents, and especially titanyl sulfate, are readily obtainable on the market at low cost and in relatively pure condition. While the sulfates of titanyl and zirconium have been specified, it will be obvious that other soluble salts of these metals such as the nitrates, or mixtures of the same, may be also employed.

Not only may the soluble salts of titanium and zirconium be employed in the invention, as has been indicated, but the use of soluble salts of other metals, and particularly those remaining in the first subgroup of Group IV and Group V of the Periodic Table of Elements which are easily hydrolyzed in acid or alkaline solutions and form insoluble white or colorless hydrous oxides, is also contemplated herein. Specifically, the soluble salts of hafnium, thorium, columbium, tantalum, antimony, and bismuth, are included, examples of which include sodium columbate, sodium tantalate, antimony trichloride, thorium nitrate, bismuth nitrate, as well as the sulfates, etc. of such metals. In the instance of sodium columbate or sodium tantalate employment, it may be necessary and desirable, due to their chemical nature, to resort to acid hydrolysis during processing.

Any of the soluble salts referred to may be independently employed in the invention or any desired mixture or combination of the same may be utilized. I have found, however, that generally optimum results obtain when the amount of soluble salt employed ranges from substantially 1% to 5% (calculated as the oxide of the metal or metals so employed) and based on the weight of the pigment. Accordingly, I prefer to employ this range amount of soluble salts, although it is understood that the invention is not limited to such amounts, but that any desired percentage concentration, based on the weight of the pigment, may be employed, depending upon the physical or other characteristics desired in the chrome pigment to be produced, such as its oil absorption properties, etc. If desired, however, the amount of addition agent or mixtures of the same, which may be associated with the resultant pigment may range to as high as substantially 10%, based on the weight of the pigment. However, as has been indicated, I preferably employ an amount of agent ranging from 1% to 5%, based on the weight of the pigment and calculated as the oxide of the metal or metals employed.

The term "lead chromate", as herein employed and in the appended claims, embraces all varieties and types of lead chromate pigments, commonly denominated in the art "chrome yellows", and particularly those consisting essentially of lead chromates with varying quantities of lead sulfate carbonate and diluents. The chrome yellows, as is known, are obtainable in a great variety of shades, varying from sulfur yellow to dark orange or a so-called chrome red. These shades depend upon and vary with the composition and degree of subdivision existing in each. For example, light shades are obtained when dilute solutions with formation of mixed crystals of lead chromate and lead sulfate are employed, whereas medium shades are in the form of neutral lead chromate. The dark shades are produced from basic lead chromate. Similarly, within such term I include the so-called chrome greens, which consist essentially of mixtures of lead chromate or chrome yellow with well-known blues, such as Prussian, Chinese, or Milori Blue and suitable diluents. The term also includes the so-called molybdated oranges which consist essentially of lead chromate, lead sulfate, and lead molybdate, as more specifically described in United States Patent No. 1,926,447.

Likewise, while I have described my invention in a particular and preferred adaptation and application to lead chromate pigments per se, it will be apparent that my invention may be applied to other types of inorganic chrome pigments, as for example the chromates of zinc, barium, and strontium. Accordingly, the term "inorganic chrome pigments", as here used and in the appended claims, embraces not only lead chromate pigments, but zinc and barium as well as strontium chromates.

I am aware that in German Patent 630,660 it has been proposed to employ titanium sulfate in the production of lead chromate, but the process and products of that patent are completely dissimilar from my invention. For example, the patent involves a co-precipitation process only wherein no organic salts of lead can be utilized and express teaching is made that temperatures in excess of 60° C. must always prevail in the process. The patentee's product is materially and radically different from the product of my invention, being, among other things, entirely monoclinic in character, long and needle-like in shape, and very coarse and voluminous in nature. Its particle size average will be greatly in excess of 5 microns, with a large proportion ranging to as high as 17 microns in length. These characteristics render the product inherently deficient in hiding power, tinctorial strength and opacity, and cause the same to exhibit undesired shade changes when incorporated into prints, especially when viewed at different angles. Accordingly, such type of product will be distinctly inferior and unsuited for pigment use, and particularly non-useful for most commercial pigment applications. Furthermore, if employed in lithographic varnishes it will exhibit marked, objectionable "lithographic breakdown" tendencies, likewise useless in such applications.

I claim as my invention:

1. A process for rendering a colored pigment stable and resistant towards lithographic breakdown, comprising intimately associating with an insoluble metallic chromate pigment, the particle size average of which does not exceed substantially 3.5 microns in length, an insoluble, white hydrous oxide of a metal from the first sub-group of Group IV and Group V of the Periodic Table of Elements.

2. A process for producing a colored pigment stable and resistant towards lithographic breakdown, comprising adding to a slurry mixture containing an insoluble metallic chromate pigment, the particle size average of which does not exceed substantially 3.5 microns in length, a soluble salt from the metals of the first sub-group of Group IV and the metals of Group V of the Periodic Table of Elements which hydrolyze to form insoluble, colorless, hydrous oxides, and maintaining the alkalinity of the reaction mixture such that an oxide of said metals becomes intimately associated with said chrome pigment.

3. A process for producing a colored pigment stable and resistant towards lithographic breakdown, comprising introducing into a water slurry containing a precipitated, insoluble metallic chromate pigment, the particle size average of which does not exceed substantially 3.5 microns in length, a soluble salt of a metal from the first sub-group of Group IV and the metals of Group V of the Periodic Table of Elements, and adjusting the pH of the resultant slurry to such value as to precipitate on said pigment a colorless hydrous oxide of a metal from said groups.

4. A process for producing a colored pigment stable and resistant towards lithographic breakdown, comprising introducing into a water slurry of precipitated lead chromate, the particle size average of which does not exceed substantially 3.5 microns in length, a soluble salt of a metal from the first sub-group of Group IV and the metals of Group V of the Periodic Table of Elements, and adjusting the pH of the resultant slurry to such value as to precipitate on said pigment a colorless hydrous oxide of a metal from said groups.

5. As a new article of manufacture, an insoluble metallic chromate pigment, the particle size average of which does not exceed substantially 3.5 microns in length, and containing an insoluble, colorless, hydrous oxide of a metal from the first sub-group of Group IV and the metals of Group V of the Periodic Table of Elements.

6. As a new article of manufacture, a lead chromate pigment, the particle size average of which does not exceed substantially 3.5 microns in length, and containing a minor amount of a hydrous, precipitated, insoluble, colorless oxide of a metal from the first sub-group of Group IV and the metals of Group V of the Periodic Table of Elements.

7. As a new article of manufacture, an anti-livering and acid-resistant, insoluble metallic chromate pigment, the particle size average of which does not exceed substantially 3.5 microns in length, containing 1-5% of an insoluble, colorless, hydrous oxide of a metal from the first sub-group of Group IV and the metals of Group V of the Periodic Table of Elements.

8. A process for rendering a colored pigment stable and resistant towards lithographic breakdown, comprising intimately associating hydrous titanium dioxide with an insoluble metallic chromate pigment, the particle size average of the latter not exceeding substantially 3.5 microns in length.

9. A process for rendering a colored pigment stable and resistant towards lithographic breakdown, comprising intimately associating hydrous zirconium oxide with an insoluble metallic chromate pigment, the particle size average of the latter not exceeding substantially 3.5 microns in length.

10. A process for rendering a colored pigment stable and resistant towards lithographic breakdown, comprising precipitating about 1-5% of hydrous titanium dioxide on an insoluble metallic chromate pigment, the particle size average of said chrome pigment not exceeding substantially 3.5 microns in length.

11. A process for rendering a colored pigment stable and resistant towards lithographic breakdown, comprising precipitating about 1-5% of hydrous zirconium oxide on an insoluble metallic chromate pigment, the particle size average of said chrome pigment not exceeding substantially 3.5 microns in length.

12. A process for producing a lead chromate pigment stable and resistant towards lithographic breakdown, comprising adding to a suspension of lead chromate having a particle size average not exceeding substantially 3.5 microns in length an aqueous solution of a soluble salt of titanium, and maintaining the reaction mixture sufficiently alkaline to hydrolyze the titanium salt and precipitate a titanium oxide compound of hydrolysis on said lead chromate pigment.

13. A process for producing a lead chromate pigment stable and resistant towards lithographic breakdown, comprising adding to a suspension of lead chromate having a particle size average not exceeding substantially 3.5 microns in length an aqueous solution of a soluble salt of zirconium, and maintaining the reaction mixture sufficiently alkaline to hydrolyze the zirconium salt and precipitate a zirconium oxide compound of hydrolysis on said lead chromate pigment.

14. As a new article of manufacture, an insoluble metallic chromate pigment, the particle size average of which does not exceed substantially 3.5 microns in length, containing in intimate association therewith a minor amount of hydrous titanium dioxide.

15. As a new article of manufacture, an insoluble metallic chromate pigment, the particle size average of which does not exceed substantially 3.5 microns in length, containing in intimate association therewith a minor amount of hydrous zirconium oxide.

16. As a new article of manufacture, an anti-livering and acid-resistant lead chromate pigment, the particle size average of which does not exceed substantially 3.5 microns in length, containing about 1-5% of precipitated hydrous titanium dioxide.

17. As a new article of manufacture, an anti-livering and acid-resistant lead chromate pigment, the particle size average of which does not exceed substantially 3.5 microns in length, containing about 1-5% of precipitated, hydrous zirconium oxide.

18. As a new article of manufacture, an anti-livering and acid-resistant lead chromate pigment, the particle size average of which does not exceed substantially 1 micron in the longer dimension of the crystal, having precipitated thereon about 1-5% hydrous titanium dioxide.

19. A process for producing a lead chromate pigment stable and resistant towards lithographic breakdown, said pigment having a particle size average not exceeding substantially 3.5 microns in length, comprising reacting in aqueous solution a lead salt with a soluble chromate, effecting said reaction in the presence of a soluble salt from the metals of the first sub-group of Group IV and the metals of Group V of the Periodic Table of Elements, and maintaining the alkalinity of the reaction mixture such that the resultant pigment has precipitated thereon an insoluble, colorless, hydrous oxide of a metal from said groups.

20. A process for producing a colored pigment stable and resistant towards lithographic breakdown, comprising maintaining an aqueous slurry containing an insoluble metallic chromate pigment having a particle size average not exceeding substantially 3.5 microns in length, at a temperature below substantially 60° C., mixing therewith a soluble salt of a metal from the first sub-group of Group IV and the metals of Group V of the Periodic Table of Elements, and maintaining the resultant mixture at such alkalinity as to precipitate on said pigment a colorless hydrous oxide of a metal from said groups.

21. An anti-livering and acid-resistant, insoluble metallic chromate pigment, the particle size average of which is not in excess of substantially 1 micron in the longer dimension of the crystal, while substantially 95% of the particles thereof are below about 2.0 microns in length, intimately associated with a small amount of a colorless, hydrous oxide of a metal from the first sub-group of Group IV and the metals of Group V of the Periodic Table of Elements.

22. An anti-livering and acid-resistant lead chromate pigment, the particle size average of which is not in excess of substantially 1 micron in the longer dimension of the crystal, while substantially 95% of the particles thereof are below about 2.0 microns in length, on which is precipitated from about 1 to 5% of an insoluble, colorless hydrous oxide of a metal from the first sub-group of Group IV and the metals of Group V of the Periodic Table of Elements.

SAMUEL C. HORNING.

CERTIFICATE OF CORRECTION.

Patent No. 2,212,917.                                          August 27, 1940.

SAMUEL C. HORNING.

It is hereby certified that error appears in the printed specification of the above numbered patent requiring correction as follows: Page 2, first column, line 45, for "($ZrOCl_2$" read --($ZrOCl_2$)--; page 3, first column, line 36, for "7296 hours" read --72-96 hours--; and that the said Letters Patent should be read with this correction therein that the same may conform to the record of the case in the Patent Office.

Signed and sealed this 29th day of October, A. D. 1940.

(Seal)                                                                            Henry Van Arsdale,
Acting Commissioner of Patents.